US009156110B2

(12) United States Patent
Chen et al.

(10) Patent No.: US 9,156,110 B2
(45) Date of Patent: Oct. 13, 2015

(54) WELDMENT WITH ISOLATION POCKET FOR REDUCTION OF WELD-INDUCED DISTORTION

(75) Inventors: Peng Marcus Chen, Ann Arbor, MI (US); Chih-Hung Chung, Troy, MI (US); Glen C. Steyer, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 169 days.

(21) Appl. No.: 13/176,794

(22) Filed: Jul. 6, 2011

(65) Prior Publication Data

US 2013/0011182 A1     Jan. 10, 2013

(51) Int. Cl.
 *B23K 31/00* (2006.01)
 *B60K 17/16* (2006.01)
 *F16H 55/17* (2006.01)

(52) U.S. Cl.
 CPC ............ *B23K 31/003* (2013.01); *B60K 17/165* (2013.01); *B23K 2201/006* (2013.01); *F16H 2055/173* (2013.01); *Y10T 403/477* (2015.01)

(58) Field of Classification Search
 CPC ................................................ B23K 15/0093
 USPC ............... 403/28–30, 265–272; 228/170, 174
 See application file for complete search history.

(56) References Cited

U.S. PATENT DOCUMENTS

| 2,983,162 | A | | 5/1961 | Musser |
| 4,125,026 | A | | 11/1978 | Torii et al. |
| 4,756,466 | A | | 7/1988 | Peck |
| 5,168,142 | A | | 12/1992 | Gartner et al. |
| 5,211,327 | A | * | 5/1993 | Clarke et al. ................. 228/174 |
| 5,573,345 | A | | 11/1996 | Voss et al. |
| 5,628,449 | A | | 5/1997 | Onuma et al. |
| 6,050,155 | A | | 4/2000 | Tortora |
| 6,589,671 | B1 | * | 7/2003 | Kehrer ......................... 428/683 |
| 6,656,079 | B2 | | 12/2003 | Eulenstein et al. |
| 6,781,266 | B2 | | 8/2004 | Le et al. |
| 7,217,905 | B2 | | 5/2007 | Hardesty et al. |
| 7,367,099 | B2 | * | 5/2008 | Painchault et al. ........ 29/407.01 |
| 7,367,914 | B2 | | 5/2008 | Rosochacki et al. |

FOREIGN PATENT DOCUMENTS

WO     WO-9958287 A1     11/1999

* cited by examiner

*Primary Examiner* — Daniel Wiley
(74) *Attorney, Agent, or Firm* — Harness, Dickey & Pierce, P.L.C.

(57) ABSTRACT

A weldment in which a first component defines a bore, a second component is received in the bore and a weld is employed to couple the second component to the first component. The first component has an isolation pocket formed about the bore such that an annular projection having an annular collar portion is formed. The isolation pocket is sized and positioned relative to the weld such that the annular collar portion is deflected about the base into a position that is radially inwardly from a position of the annular collar portion prior to the formation of the weld such that the isolation pocket controls axial shrinkage associated with the formation and cooling of the weld.

4 Claims, 6 Drawing Sheets

WELDMENT WITH ISOLATION POCKET FOR REDUCTION OF WELD-INDUCED DISTORTION

FIELD

The present disclosure relates to a weldment with an isolation pocket that is configured to reduce weld-induced distortion in the components of the weldment.

BACKGROUND

This section provides background information related to the present disclosure which is not necessarily prior art.

Welding is a common technique for permanently coupling components to one another. One drawback of welding concerns the tendency of the components to distort as a consequence of stresses created by the welding operation. In some instances, it may be possible to machine the weldment after the welding operation to remove distorted portions of the weldment. It will be appreciated, however, that such machining operations may be costly. When one of the components is a highly machined and hardened component, such as a ring gear for an automotive differential assembly, it may not be practical to machine the weldment subsequent to the welding operation.

Various techniques have been suggested for forming weldments. For example, U.S. Pat. No. 6,589,671 discloses the use of relatively shallow round grooves disposed on opposite sides of a weld to "compensate for thermal expansion". We have found such techniques to be ineffective. Accordingly, there remains a need in the art for an improved weldment and process for forming a weldment in which distortion of one or more of the welded components is more effectively abated.

SUMMARY

This section provides a general summary of the disclosure, and is not a comprehensive disclosure of its full scope or all of its features.

In one form, the present teachings provide a weldment having a first component, a second component and a weld. The first component has a first body, a bore and an isolation pocket. The bore is formed through a first axial end of the first body. The isolation pocket is formed about the bore to create an annular projection between the isolation pocket and the bore. The second component has a second body that is received in the bore. The weld couples the first body to the second body. The weld is formed on the first axial end and extends inwardly therefrom by a penetration distance. A dimension from a center of the weld to a radially outer edge of the annular projection is about 3 mm to about 10 mm and a depth of the isolation pocket is within +/−40% of the penetration distance.

In another form, the present teachings provide a weldment having a first component, a second component and a weld. The first component has a first body, a bore and an isolation pocket. The bore is formed through a first axial end of the first body. The isolation pocket is formed about the bore to create an annular projection between the isolation pocket and the bore. The annular projection has an annular collar portion and base that couples the annular collar portion to a remainder of the first body. The second component has a second body that is received in the bore. The weld is formed on the first axial end and couples the first body to the second body. The isolation pocket is sized and positioned relative to the weld such that the annular collar portion is deflected about the base into a position that is radially inwardly from a position of the annular collar portion prior to the formation of the weld such that the isolation pocket controls axial shrinkage associated with the formation and cooling of the weld.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
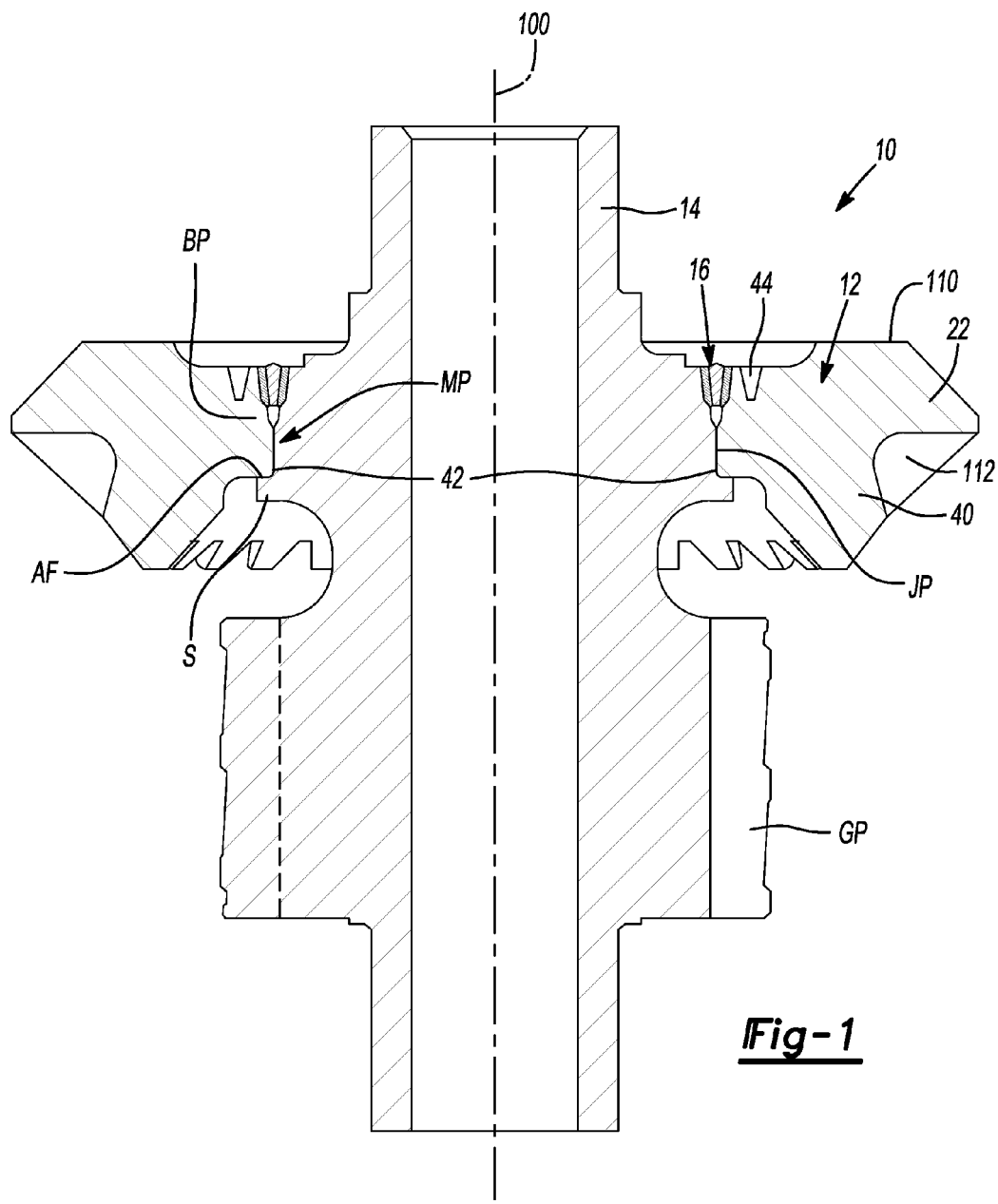
FIG. 1 is a longitudinal section view of an exemplary weldment constructed in accordance with the teachings of the present disclosure.
Figure 2:
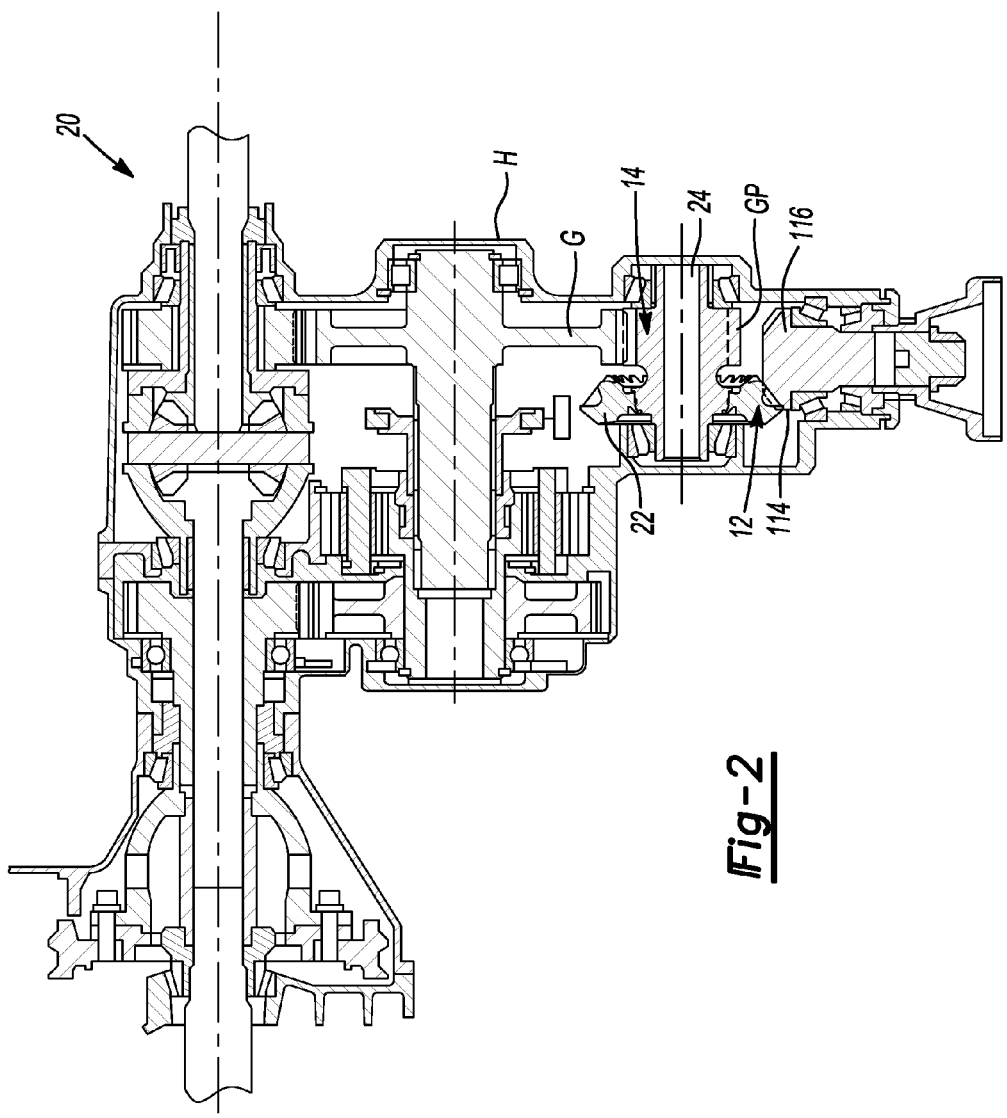
FIG. 2 is a section view of an exemplary power take-off unit that incorporates the weldment of FIG. 1.
Figure 3:
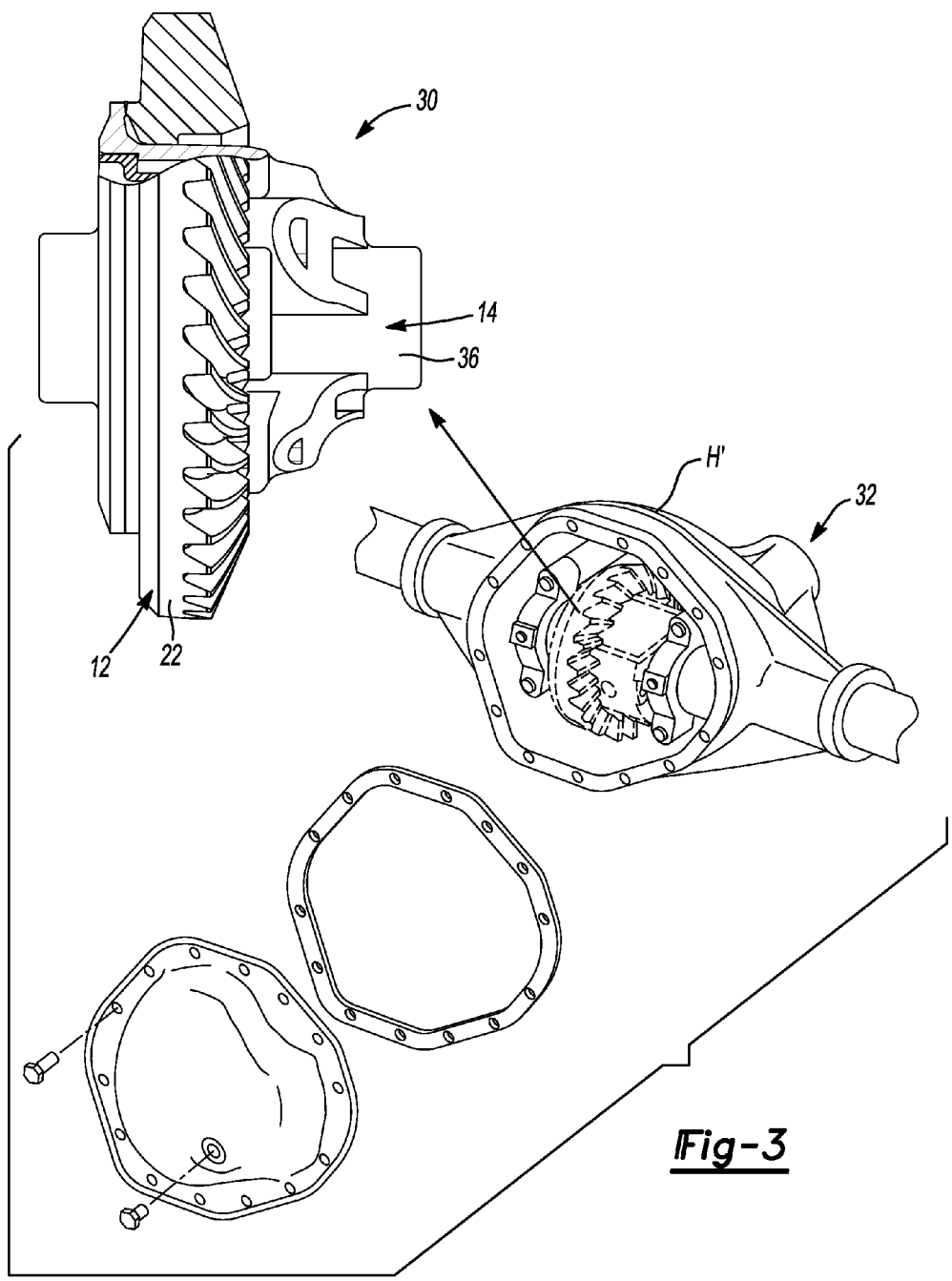
FIG. 3 is an exploded view of an axle assembly that incorporates another weldment constructed in accordance with the teachings of the present disclosure, the weldment being a differential assembly that is partly shown in section.

With reference to FIG. 1 of the drawings, an exemplary weldment constructed in accordance with the teachings of the present disclosure is generally indicated by reference numeral 10. The weldment 10 can comprise a first component 12, a second component 14 and a weld 16. In the particular example provided, and with brief additional reference to FIG. 2, the weldment 10 is a component of a power take-off unit 20 for an all-wheel drive driveline, the first component 12 is a bevel ring gear 22, the second component 14 is a power take-off ring gear shaft 24, the weld 16 is formed via laser welding and the ring gear shift 24 is rotatably received in a housing H. It will be appreciated, however, that the teachings of the present disclosure have broader applicability. For example, the weldment 10 could be a differential assembly 30 for an axle assembly 32 in which the first component 12 is a ring gear 22 that is rotatably received in a carrier housing H' and the second component 14 is a differential case 36 as is shown in FIG. 3. The teachings of the present disclosure, however, are not limited to power take-off units or even more generally to driveline components, but rather have broader application as will be appreciated by those of skill in the art.

Figure 4:
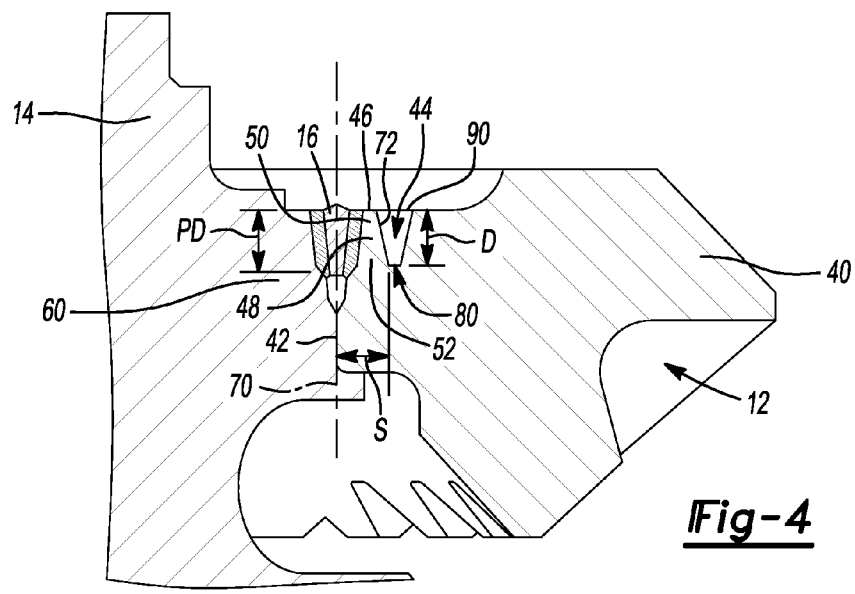
FIG. 4 is an enlarged portion of FIG. 1 illustrating a weld that secures a first component to a second component, the first component having an isolation pocket.
Figure 5:
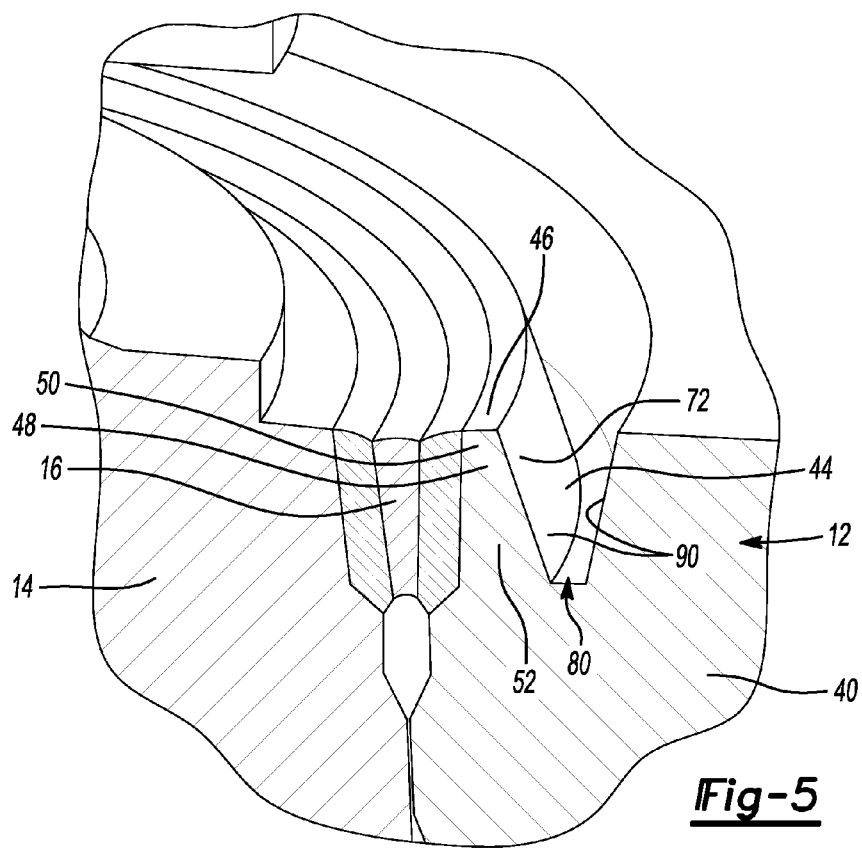
FIG. 5 is a perspective section view of a portion of the weldment of FIG. 1 illustrating the weld and the isolation pocket in more detail.

With reference to FIGS. 1, 4 and 5, the first component 12 can have a first body 40 that can have an abutting face AF and a bore portion BP, which can define a bore 42, and an isolation pocket 44. The bore 42 extends at least through a first axial end 46 of the first body 40 and can extend completely through the first body 40 as is shown in the particular example provided. The isolation pocket 44 can be formed about the bore 42 to create an annular projection 48 between the isolation pocket 44 (i.e., the void space of the isolation pocket 44) and the bore 42. The annular projection 48 can have an annular collar portion 50 and a base 52 that couples the annular collar portion 50 to a remainder of the first body 40.

The second component 14 can have a second body 60 that can be received into the bore 42. Optionally, the second component 14 can be received (i.e., extend) through the bore 42. The second component 14 can have a geared portion GP, which is configured to meshingly engage a gear G in the power take-off unit 20, and a mount portion MP that can define a journal portion JP that terminates at a shoulder S. The abutting face AF of the first component 12 can be abutted against the shoulder S.

The weld 16 can be formed in any manner desired, including TIG, MIG or laser welding and can fixedly couple the first and second components 12 and 14 to one another. The weld 16 can have a penetration distance PD (i.e., a dimension from the first axial end 46 to an end of the weld 16 that is distant from the first axial end 46, the weld 16 being the zone over which the first and second components 12 and 14 are bonded to one another). The weld 16 can extend in a continuous manner about the perimeter of the second body 60 (e.g., a circle weld), or could be formed as a series of discrete weld segments that are disposed in a spaced apart manner about the perimeter of the second body 60.

The isolation pocket 44 is sized and positioned relative to the weld 16 such that the annular collar portion 50 deflects about the base 52 into a position that is radially inwardly and axially away from a position of the annular collar portion 50 prior to the formation of the weld 16 so that the isolation pocket 44 controls axial shrinkage associated with the formation and cooling of the weld 16. Stated another way, the isolation pocket 44 is sized and positioned such that the annular collar portion 50 is relatively flexible and deforms radially inwardly and shrinks freely in the axial direction as the weld 16 cools.

We have found it advantageous to position the isolation pocket 44 such that a dimension from a center 70 of the weld 16 to a point on a radially outer edge 72 of the annular projection 48 is about 3 mm (i.e., 3 mm±0.3 mm) to about 10 mm (i.e., 10 mm±1.0 mm) in length and preferably about 5 mm (i.e., 5 mm±0.5 mm) in length. We have also found it advantageous in some instances to form the isolation pocket 44 such that its depth D (from the first axial end 46) is within ±40% of the penetration distance PD (i.e., (1.4×PD)≥D≥(0.6×PD)). For example, the depth D of the isolation pocket 44 can be within ±30% of the penetration distance PD or within ±20% of the penetration distance PD. As another example, the depth D of the isolation pocket 44 can be greater than or equal to the penetration distance PD.

Figure 6:
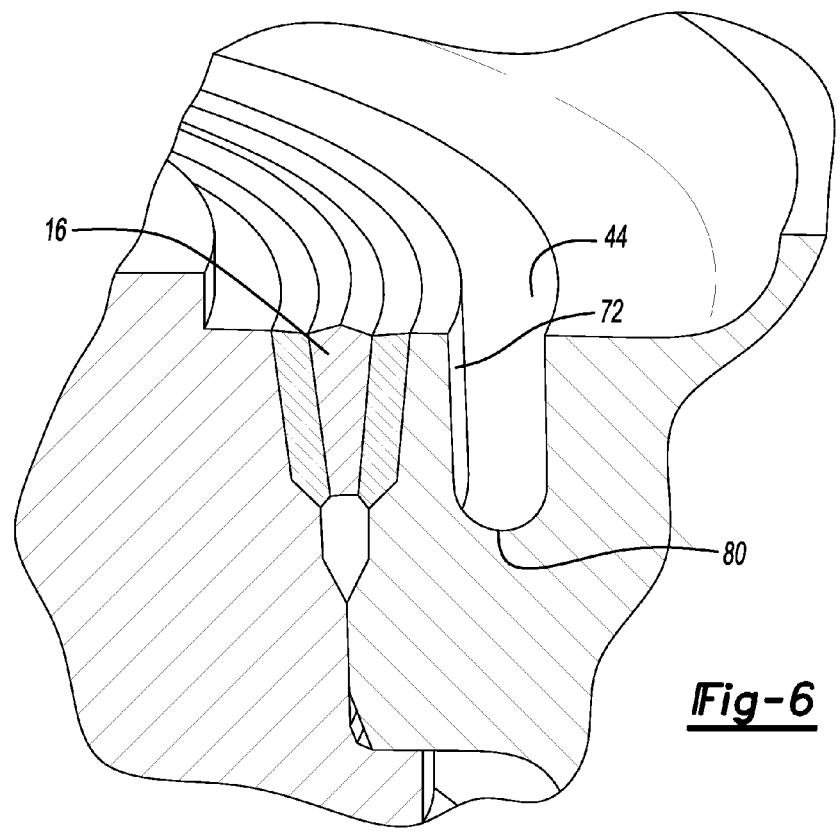
FIG. 6 is a view similar to that of FIG. 5 but illustrating an alternately constructed isolation pocket.
Figure 7:
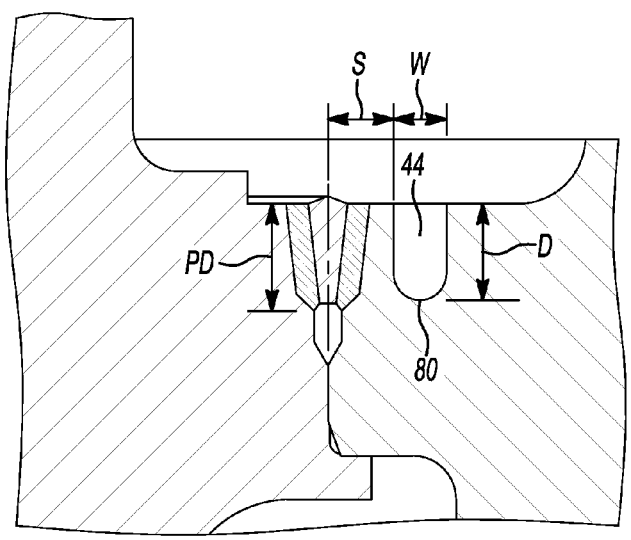
FIG. 7 is a section view of a portion of a weldment depicting the alternately constructed isolation pocket of FIG. 6.
Figure 8:
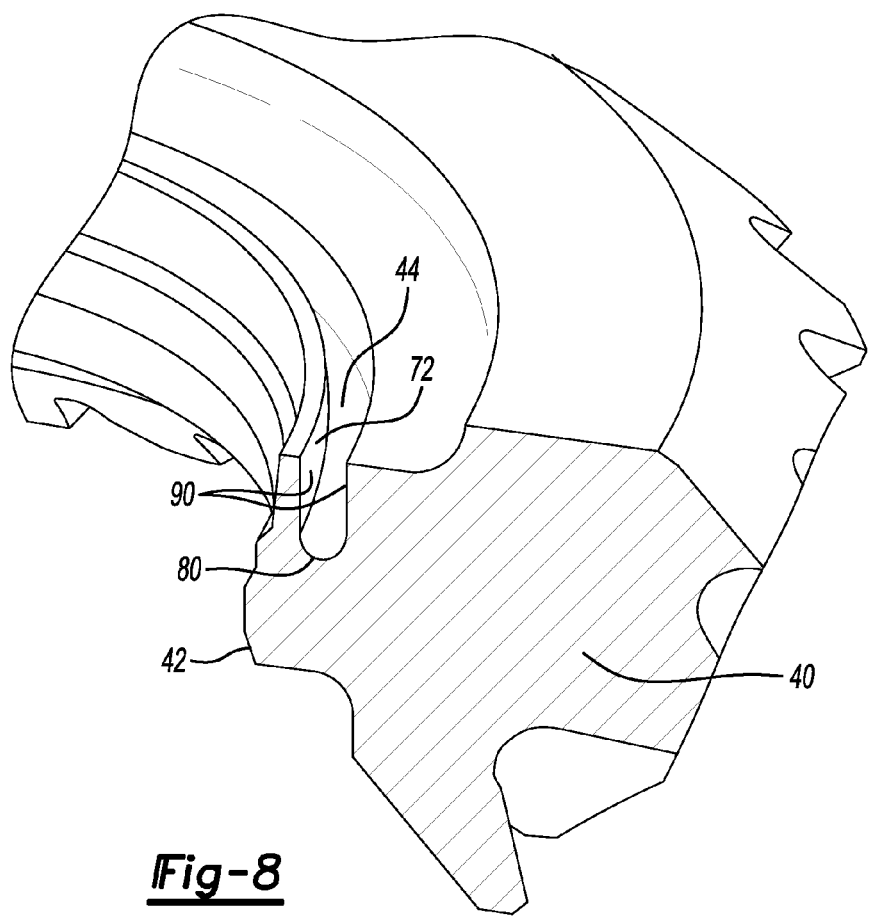
FIG. 8 is a perspective, partly sectioned view of an exemplary first component having the alternately constructed isolation pocket of FIG. 6.

The isolation pocket 44 can have an end face 80 that can be shaped in any desired manner. In the example of FIGS. 1, 4 and 5, the isolation pocket 44 has a generally V-shaped end face 80, while in the example of FIGS. 6 through 8, the isolation pocket 44 has a generally U-shaped end face 80. Accordingly, it will be appreciated that the sides 90 of the isolation pocket 44 can be shaped in any desired manner, such as slanted or generally parallel to one another. It will be appreciated that the sides 90 of the isolation pocket 44 need not be symmetrically disposed about a mid-point of the isolation pocket 44. In situations where the radially inward side of the isolation pocket 44 is at least partly formed parallel to a central axis 100 (FIG. 1) of the bore 42, at least a portion of the radially outer edge 72 of the annular projection 48 can be cylindrically shaped.

In our analysis, we have determined that the width of the isolation pocket 44 has relatively little effect on distortion and as such, we have employed widths in the range of 2.0 mm to 6.0 mm.

As compared with a similarly constructed weldment in which the first component lacks an isolation pocket, we have found through finite element analysis (i.e., simulation) that the placement and configuration of the isolation pocket 44 can reduce distortion of the first component 12 by over 50%. With regard to the example of FIG. 1, the heel 110 of the toothed ring gear 22 distorts in a radially inward direction as a result of the formation of the weld 16. As the teeth 112 of the ring gear 22 are finished (i.e., the teeth 112 of the ring gear 22 are machined, the ring gear 22 is heat-treated, and the teeth 112 of the ring gear 22 are lapped with teeth 114 (FIG. 2) of a pinion gear 116 (FIG. 2) so that the pinion gear 116 and ring gear 22 are matched as a set that is later assembled to the remainder of the power take-off unit 20).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline power transmitting component comprising:
  a housing;
  a shaft disposed within the housing for rotation about an axis, the shaft including a geared portion, which is configured to meshingly engage a gear in the driveline power transmitting component, and a mount portion, the mount portion defining a journal portion that terminates at a shoulder;
  a bevel ring gear received on the mount portion, the ring gear defining a plurality of gear teeth, a bore portion, an abutting face and an isolation pocket, the bore portion being received on the journal portion, the abutting face being abutted against the shoulder, the isolation pocket being formed into the ring gear on a side opposite the abutting face, the isolation pocket being formed into the bore portion to create an annular projection between an outer annular side of the isolation pocket and the journal portion;
  a weld coupling the annular projection to the journal portion, the weld extending over a penetration distance, wherein a depth of the isolation pocket is less than or equal to the penetration distance and wherein the dimension from the center of the weld to the radially outer edge of the annular projection is about 5 mm; and
  a pinion gear meshingly engaged with the bevel ring gear;
  wherein the isolation pocket is not configured to reduce stress in the weld but rather to permit the annular projection to flex inwardly toward the journal portion to reduce distortion of the ring gear.

2. The driveline power transmitting component of claim 1, wherein when viewed in section, the isolation pocket has a generally V-shaped end face.

3. The driveline power transmitting component of claim 1, wherein when viewed in section, the isolation pocket has a generally U-shaped end face.

4. The driveline power transmitting component of claim 1, wherein at least a portion of the radially outer edge of the annular projection is cylindrically shaped.

\* \* \* \* \*